United States Patent
Gane et al.

(10) Patent No.: US 8,074,909 B2
(45) Date of Patent: Dec. 13, 2011

(54) METHOD FOR DRY GRINDING A MATERIAL CONTAINING A CARBONATE ORE

(75) Inventors: Patrick A. C. Gane, Rothrist (CH); Matthias Buri, Rothrist (CH); René Vinzenz Blum, St. Urban (CH); Jacques Mongoin, Quincieux (FR)

(73) Assignees: Omya Development AG, Oftringen (CH); Coatex S.A.S., Genay (FR)

( * ) Notice: Subject to any disclaimer, the term of this patent is extended or adjusted under 35 U.S.C. 154(b) by 265 days.

(21) Appl. No.: 12/227,536

(22) PCT Filed: May 22, 2007

(86) PCT No.: PCT/IB2007/001323
§ 371 (c)(1),
(2), (4) Date: Dec. 18, 2008

(87) PCT Pub. No.: WO2007/138410
PCT Pub. Date: Dec. 6, 2007

(65) Prior Publication Data
US 2009/0312459 A1    Dec. 17, 2009

(30) Foreign Application Priority Data

May 24, 2006    (FR) ...................................... 06 04690

(51) Int. Cl.
*B02C 1/00*    (2006.01)
(52) U.S. Cl. ........................................................ 241/21
(58) Field of Classification Search .................... 241/16, 241/22, 24.24, 24.31, 21
See application file for complete search history.

(56) References Cited

U.S. PATENT DOCUMENTS

| 5,181,662 A | * | 1/1993 | Bousquet et al. ............... 241/16 |
| 5,736,601 A | * | 4/1998 | Egraz et al. .................... 524/425 |
| 2003/0045647 A1 | | 3/2003 | Suau et al. | |

FOREIGN PATENT DOCUMENTS

| EP | 0 296 610 A2 | 12/1988 |
| WO | WO 01/29125 A | 4/2001 |
| WO | WO 02/081573 A1 | 10/2002 |
| WO | WO 2005/026252 A | 3/2005 |
| WO | WO 2005/071003 A1 | 8/2005 |

OTHER PUBLICATIONS

The International Search Report for PCT Application No. PCT/IB2007/001323.
The Written Opinion for PCT Application No. PCT/IB2007/001323.

* cited by examiner

*Primary Examiner* — David J. Walczak
*Assistant Examiner* — Jennifer C Chiang
(74) *Attorney, Agent, or Firm* — Amster, Rothstein & Ebenstein LLP; Craig J. Arnold

(57) ABSTRACT

The present invention is directed to a method for dry milling a material containing a carbonate ore. The method comprises the following steps: (a) dry milling the material in at least one milling unit: (i) in the presence of at least one polyalkylene glycol polymer having monomer units forming a backbone, where at least 90% of the monomer units forming the backbone of the polymer are constituted by ethylene oxide, propylene oxide or their mixtures, and where the polymer has a molecular weight of at least equal to 400 g/mole, (ii) such that the milling unit contains a quantity of water that is less than 10% in dry weight of the material in the milling unit; (b) optionally classifying the material from step a) with at least one classification unit; and (c) optionally repeating steps a) and/or b) with all or part of the material from step a) and/or step b).

35 Claims, No Drawings

METHOD FOR DRY GRINDING A MATERIAL CONTAINING A CARBONATE ORE

This is a U.S. national phase of PCT Application No. PCT/IB2007/001323, filed May 22, 2007, and claims priority to French Application No. 06/04690, filed May 24, 2006.

A first object of the invention is a method for dry grinding a material containing a carbonate ore, characterized in that said method comprises the steps of:
a) dry grinding said material in at least one grinding unit:
(i) in the presence of at least one polyalkylene glycol polymer where at least 90% but preferably 95% at least, and very preferably 98% at least of the monomer units forming the backbone of the said polymer are constituted by ethylene oxide, propylene oxide or their mixtures, and where the molecular weight is at least equal to 400 g/mole, (ii) such that the quantity of water in the said grinding unit is less than 10% in dry weight of the said material in the said grinding unit;
b) the ground material may then be classified according to step a) with at least one classification unit;
c) the steps a) and/or b) may be repeated with all or part of the ground material from step a) and/or step b).

Another object of the present invention is a product coming from step a) and/or b) and/or c) of the method of the invention.

A third object of the present invention is the use of the said product from step a) and/or b) and/or c) for making sealants, paper, paint, plastic or for formulas used in agriculture.

The additives introduced during the step of grinding materials containing carbonate ores have long been used to facilitate the grinding method, to assist in the particle size reduction process, and to increase the capacity and effectiveness of the grinding method. Such additives are known as grinding aid agents.

As opposed to grinding aid agents that may be used for grinding materials containing carbonate ores in a humid environment, implementing a water content above 10% by weight compared to the dry weight of the material to be ground, grinding aid agents that may be used for grinding such materials in a dry medium are subject to surface desorption and adsorption energies which are different from those of grinding agents that may be used in a liquid environment. Additionally, and among other differences, these dry grinding agents are particularly intended to be implemented in a hydrophobic environment, as opposed to the hydrophilic environment in which wet grinding agents are implemented.

Dry grinding is generally performed in a grinder, and results from an autogenous grinding method, in which the particles to be ground strike one another, or result from additional impact with one or more other materials, such as grinding beads. Such grinding may occur, for example, with a ball mill, vibration mill, or wheel mill. Depending on the type of grinding, said grinding may take place in a stationary or rotating grinding chamber. Dry grinding agents may be added to the supply and/or into the grinding chamber and/or over the course of the grinding method.

A general discussion on dry grinding agents and their role in the grinding method can be found in "Beitrag zur Aufklårung der Wirkungsweise von Mahlhilfsmitteln" by K. Graichen et al., published in "Freiberger Forschungshefte" VEB Deutscher Verlag fur Grundstoffindustrie, Leipzig, Germany (1975). There is another general article on the dry grinding of calcium carbonate: "Calcium Carbonate" by F. W. Tegethoff (Birkhâuser Verlag, 2001).

Generally speaking, dry grinding agents may be placed into one of the three following categories.

The first group of dry grinding aid agents for grinding materials containing calcium carbonate, and more particularly calcium carbonate, is traditionally made up of weak Brùnstedt acids, such as formic, acetic, lactic, lignitic, adipic, or fatty acids, and in particular palmitic and stearic acids, or the salts of weak Brønstedt acids, such as lignin sulfate salts.

In this context, the document FR 2 863 914 describes the use of adipic acid during the dry grinding of a mineral material, for the purpose of preventing the ground material from later reagglomerating or to prevent dust from forming during grinding. However, such an acid limits the use of the ground material in products that require a high electrical resistivity, such as PVC cables. Such additives are also used specifically to increase the efficiency of the grinding.

To that end, the document FR 2 203 670 describes a dispersion agent for dry grinding in the form of aliphatic esters such as aliphatic acetates, which exhibit the drawback of easily becoming saponified under alkaline conditions.

Sulfonate lingin salts, which are commonly used in the cement industry, have the disadvantage of leading to a brown coloring, and reduce the resistivity of the end material. These two drawbacks limit the potentially limitations of said salts.

Finally, the document WO 98/21158 describes a method for dry grinding calcinated kaolins by implementing an ammonium polyacrylate as a dry grinding aid agent, for the purpose of improving the fluidity of the ground product, the efficiency of the grinding, and the rheological properties of the end product in which the ground products according to that invention are implemented.

A second group of dry grinding aid agents is made up of weak Brønstedt bases; this group particularly includes amine bases.

Illustrating the two previous groups, the person skilled in the art knows the document EP 0 510 890, which describes a device for grinding solid particle materials, and more particularly inorganic materials, which may carbonate-based, in roughly a dry state, as well as a method for grinding through the attrition of such materials for the purpose of uniformly distributing the grinding aid additive throughout the inorganic material. The treatment agent may be a fatty acid, and in particular stearic acid, which is used in the example, an amine or a quaternary ammonia having at least one alkyl group or a substituted silane.

Furthermore, such additives are well known for their ability to minimize the formation of aggregates of ground materials during or after the dry grinding method.

The document GB 2 179 268 describes a method for grinding a material, which may include a carbonate, in roughly a dry state. The additives introduced during this method for the purpose of minimizing the formation of aggregates comprise fatty acids, such as stearic acid (which is also used as an example), and salts of fatty acids such as surface agents which are cationic in nature, such as amines, and more particularly diamines (alkyl propylene diamine being an example), and silanes. Alkyls and alkyl-phenyl-ethoxylates are also described, and particularly octyl-phenoxy-polyethoxyethybenzyl ether. Phosphate esters, mono-or di-alkali metallic salts of a maleic anhydride copolymer, and di-isobutylene are also mentioned. Finally, suphosuccinates are also described as usable in the method according to that document.

With respect to the two groups of dry grinding aid agents mentioned above, the document FR 2 863 914 reveals a significant disadvantage of stearic acid: it does not enable the obtaining of ground particles with a diameter less than 25 μm.

It is also important to mention that the ethoxylates, esters, and ethers mentioned above may lead to the formation of foam in the later applications for which the dry ground materials are intended. Additionally, nonpolar silanes are well known as a potential source of problems, such as leaving deposits, in end-stage papermaking applications. Finally, suphosuccinate sets may alter the electrical resistivity of the end products containing the dry ground materials.

Regarding the amines, it has been noted that in addition to their changing the electrical resistivity of the end product in which the dry ground material is found, such dry grinding aid agents may act as complicating agents in the end application in which they may be used, and in particular with respect to the cobalt-based compounds used in manufacturing polyesters, which makes controlling the reactivity of said polyester difficult. Additionally, for primary and secondary amines, the formation of nitrogenous amines.

Lewis bases constitute the third group of dry grinding aid agents, and particularly contain alcohols. Such alcohols particularly include ethylene glycols, diethylene glycols, triethylene glycols, propylene glycols, and dipropylene glycols. For example, the documents WO 2002/081 573 and US 2003/019 399 describe the use of diethylene glycol as a dry grinding aid agent in table 1 of both documents.

The document WO 2005/071 003 describes a calcium carbonate core at least partially covered by a layer added by means of two consecutive, distinct treatment steps, with each step implementing a different treatment. The purpose of this invention is to provide calcium carbonate particles with improved dispersibility and a lower tendency to agglomerate. This invention generally refers to a polyhydric alcohol, corresponding to ethylene glycol, which constitutes the first and/or second treatment agent. It is briefly mentioned that this treatment agent may be added during a grinding method, though without any aspects of said process being described or disclosed.

Some of these additives are added for the purpose of improving the compatibility of the ground materials in the end-use application.

To that end, the person skilled in the art knows the document WO 2005/026 252, which describes a surface-modified filler comprising particulate fillers, which may, among other alternatives, be calcium carbonate, where the surfaces of this load are modified with a plurality of hydroxyl groups. Such fillers are rendered incompatible and dispersible in polymer resins. In the event that said filler is a natural calcium carbonate, the document indicates that said calcium carbonate is preferably modified by dry grinding in the absence of hygroscopic or hydrophilic chemicals. The grinding aid agent may be a triethanolamine, a polypropylene, or an ethylene glycol.

In reality, the grinding aid agents which are mono- or pluri-glycol, with a molecular weight generally less than 330 g/mole, are frequently used in industry, and have numerous advantages, including their low cost.

However, regarding this sort of grinding aid agents, it has been noted that the decomposition products that result from dry-grinding materials containing a carbonate ore, and particularly CaO and $Ca(OH)_2$, which the Applicant believes form on the surface of the carbonate material, may react with the glycols commonly used in industry, which causes an unacceptable yellowing in the ground product. This observation was confirmed in the example section of this Application. In particular, this yellowing was observed when using ethylene glycol, and to a much larger degree for mono-, di-, and triethylene glycols, and monopropylene glycol.

With a view to using these monoglycols and oligomeric glycols, the person skilled in the art must address the following problem: reducing the size of the particles of a material containing a carbonate ore via a dry grinding method, without causing yellowing in the ground product.

Furthermore, when seeking out a glycol solution to resolve the problem mentioned above, the person skilled in the art must find a dry grinding aid agent which is effective for said grinding (in terms of production capacity, and potentially in terms of grinding energy), among the glycol-based solutions disclosed in the prior art, and potentially among other traditional but glycol-free solutions.

Additionally, this solution must not make use of quantities of grinding aid agents which could substantially alter the properties of the ground material, or the properties of the end product containing said ground material.

Finally, the person skilled in the art remains aware of environmental problems, and seeks to minimize potential pollutants that result from the materials added to any industrial grinding unit.

In response to these questions, the Applicant has developed a method that surprisingly resolves all of the problems mentioned above.

It is a method for dry-grinding a material containing a carbonate ore, characterized in that said method comprises the steps of:

a) dry grinding said material in at least one grinding unit: (i) in the presence of at least one polyalkylene glycol polymer where at least 90% but preferably 95% at least, and very preferably 98% at least of the monomer units forming the backbone of the said polymer are constituted by ethylene oxide, propylene oxide or their mixtures, and where the molecular weight is at least equal to 400 g/mole, (ii) such that the quantity of water in the said grinding unit is less than 10% in dry weight of the said material in the said grinding unit;

b) the ground material may then be classified according to step a) with at least one classification unit;

c) the steps a) and/or b) may be repeated with all or part of the ground material from step a) and/or step b).

Such glycol alkaline polymers according to step a) of the inventive method are prepared through polymerization reactions which cause little or no esterification, generally through polymerization of epoxy-based monomers, in which the two carbon atoms which form the ether epoxide ring contain only hydrogen atoms and/or a simple methyl group.

While such polyalkylene glycol polymers are well known in various industries including, but not limited to, mold removal for rubbers, softening or scouring agents for textiles, softening agents in the papermaking industry, and anti-corrosion agents for the metal industry, they have never been described as dry grinding aid agents for grinding materials containing a carbonate ore.

In the summary of the document "Characterisation of the mechanical grinding of water-cooled blast-furnace slags by means of x-ray diffraction" (Tohoku Daiguku Senko Seiren Kenkyusho Iho (1989), 45(2)), the grinding of blast-furnace slag is described, based, among other chemicals, on polyethylene glycols, without the nature of the grinding operating being specified. Even though calcium carbonate is mentioned as part of the structures found in the slag, this does not help the person skilled in the art in any way, because all blast-furnace slag heated to more than 850° C. generally contains corresponding oxides, like calcium oxide, or silicon oxide, or calcium silicate.

In light of the known methods which deal with mineral-based materials and with a glycol polymer having a relatively high molecular weight, the person skilled in the art knows the document US 2002/0004541, which describes ethylene oxide-based and propylene oxide-based surface-active block polymers, as well as a method to prepare them. The object of the invention described in this document, which, again, remains outside of the scope of the present Application, is achieved by combining this low-molecular weight glycol copolymer with water and a sulfosuccinate dialkyl. It is indicated in this document ([0013]) that such block polymers may be used as grinding aid agents, even though no indication is provided regarding the nature of the materials to be ground, nor the nature of the grinding (dry or wet), nor the effectiveness of said grinding method.

In fact, in light of the preceding document, which instructs that it is better to avoid solid forms or waxes of ethylene oxide or propylene oxide block polymers, the Applicant has surprisingly found that the method according to the present invention also worked in the presence of glycol polyalkylene polymers identified in the claims as being present in the solid state or in the wax state.

Finally, the document US 2005/0107493 describes a method for producing treated fine solid inorganic particles, the surface of these particles being treated by fine solid inorganic particles, such as carbonates, and containing at least two different organic additives. It is indicated that the second additive may be a glycol polyethylene, without mentioning its molecular weight. It is possible to induce the change, which may take place during a step of grinding ([0017]), with or without water. However, no indication is provided regarding the potential function of a grinding aid agent fulfilled by glycol, nor the effectiveness of such grinding, nor the fact that it is dry grinding described or expounded in a few details. Furthermore, the purpose of this invention is completely different from the one covered by the present Application, because it involves obtaining an agglomerated material with a uniform distribution of additives throughout its surface.

In this manner, none of the documents in the prior art deal with the following problem, which the person skilled in the art must resolve: grinding and dividing a carbonate ore through a dry grinding method, without leading to a product with too much yellowing.

More particularly, the resolution of this problem, in combination with the other requirements of the person skilled in the art, is not described in any of the documents of the prior art, nor their possible combinations:
  providing an effective grinding method (in terms of production capacity and the grinding energy required), and more particularly one which is effective compared with the glycol-based solutions of the prior art, and also potentially compared with other conventional glycol-free solutions, avoiding the use of quantities of grinding aid agents that could alter the properties of the end product, in order to carry out effective grinding, avoiding using a grinding aid agent which acts as a complexing agent during the manufacture of polyesters, making the reaction speed test difficult as a result, providing a grinding aid agents that will lead to a reduced quantity of volatile organic compounds (VOCs) in the ground product, to take into account the obligations related to air pollution.

With respect to this last requirement, it must be noted that even with low steam pressure of about $10^{-2}$ mm of Hg and with boiling points of about 250° C. or higher, most of the glycols used in the prior art as grinding aid agents can fully evaporate, event at low temperatures of about 45° C., and do so over a period of about 16 hours.

The Applicant also would like to emphasize that if certain polyglycols are used as dry grinding aid agents, such agents are implemented for grinding non-carbonate materials, and in particular those in the field of ceramics and in the metal industry.

The person skilled in the art had no objective reasons to seek out a solution to his technical problem in such fields, and, even if he had, he would not have found a document treating the same technical problem, or a technical problem similar to the one which he is seeking to resolve here.

For example, the document JP 10-245581 describes the use of polyethylene oxide and polypropylene oxide ester copolymers with a carboxylic acid, in order to obtain an oil with improved properties such as resistance to rust and to the formation of foam, when it is used for cutting materials or grinding them, which is irrelevant to the sole context of method for manufacturing metals. Likewise, the document JP 10-245582 pertains to the same invention but refers to ethers.

The webpage http://www.surfactant.co.kr/surfactants/peg.html refers to glycols used only in grinding metals.

The document WO 84/01 372 describes a method for preparing Si3N4 ceramic materials in which the product Carbowax™ (which is a polyethylene glycol) may be used to dry-grind these materials.

Husemann et al., in the document "Enhancing the effectiveness of dry ultrafine grinding and classifying processes by addition of surfactants" (Aufbereitungs-Technik 35 (1994) Nr. 8), are concerned with the need to effectively produce ultrafine particles, especially for extremely hard materials. These authors indicate that the glycol polyethylene constitutes a grinding aid agent which is relevant to SiC, particularly to avoid forming agglomerates.

The summary of the document CS 181 565 refers to dry-grinding titanium dioxide by adding glycol polyethylene of an undefined molecular weight, for the purpose of increasing the grinding ability and to improve the dispersibility of the titanium dioxide in organic binders.

Finally, Fukimori et al., in the document "Dry grinding chitosan powder by a planetary bail mill" (Advanced Powder Technol., Vol. 9, No 4 (1998)) describe the dry grinding of chitosan polysaccharide chitosan with a polyethylene glycol whose molecular weight is 4,000 g/mole.

Additionally, none of these prior art documents, nor any of their combinations, pertains to the problem resolved by the present invention, which is grinding materials containing a carbonate ore, through a dry grinding method, without causing the yellowing of the ground product.

As indicated above, a first object of the invention consists of a method for dry grinding a material containing a carbonate ore, characterized in that said method comprises the steps of:
a) dry grinding said material in at least one grinding unit:
  (i) in the presence of at least one polyalkylene glycol polymer where at least 90% but preferably 95% at least, and very preferably 98% at least of the monomer units forming the backbone of the said polymer are constituted by ethylene oxide, propylene oxide or their mixtures, and where the molecular weight is at least equal to 400 g/mole, (ii) such that the quantity of water in the said grinding unit is less than 10% in dry weight of the said material in the said grinding unit;
b) the ground material may then be classified according to step a) with at least one classification unit;
c) the steps a) and/or b) may be repeated with all or part of the ground material from step a) and/or step b).

As indicated above, such glycol alkaline polymers according to step a) of the inventive method are prepared through polymerization reactions which cause little or no esterification, generally through polymerization of epoxy-based monomers, in which the two carbon atoms which form the ether epoxide ring contain only hydrogen atoms and/or a simple methyl group.

The additional elements less than 10%, preferentially less than 5%, very preferentially less than 2% forming the rest of the backbone of the polymer, and which are not ethylene oxides, propylene oxides or mixtures thereof, are contaminants which inhibit the activity of the polyalkylene glycol polymer as a dry grinding aid agent. Such impurities may, for example, be introduced during the synthesis of such polymers, and may result from incorporating epoxide-based monomers in which 2 atoms which form the ether epoxide ring contain at least one alkyl group.

In the inventive method, it is preferable that the water content within the grinding unit be less than 2% by weight, and preferentially less than 0.5% by weight, compared to the total dry weight of the material to be ground in said grinding unit. This water content is determined by the loss of weight observed when the material ground within the grinding unit is heated at 120° C. in an kiln until a constant weight is obtained; the loss in weight, expressed as a percentage of the original material's initial weight, indicates the water content.

With respect to the glycol polyalkylene polymer implemented during step a) of the method, the invention is also characterized in that said polymer has a molecular weight (Mw) of less than 9500 g/mole.

In the present invention, all molecular weights (Mw) correspond to the mean molecular weights determined using the distribution by molecular weight of said polymer. This distribution is determined using the reference guide 118 "OECD Guideline for Testing of Chemicals: Determination of Number-Average Molecular Weight and the Molecular Weight Distribution of Polymers using Gel Permeation Chromatography" adopted on Jun. 14, 1996, in water, using as master chemicals the standard DIN polyethylene glycols available from Polymer Standards Service GmbH in Mayence, Germany, under the names: PSS-dpeg400, PSS-dpeg600, PSS-dpeg1k, PSS-dpeg1.5k, PSS-dpeg2k, PSS-dpeg3k, PSS-dpeg4k, PSS-dpeg6k et PSS-dpeg10k.

Regarding the quantity of polyalkylene glycol polymer employed in the present invention, this quantity must be determined by the person skilled in the art, based on the final objective in terms of particles size. However, it may be advantageous to implement 0.01 to 0.5% by dry weight, preferentially 0.03 to 0.25% by dry weight of said polymer, with respect to the dry weight of the material containing a carbonate ore in each grinding unit.

In another variant, the inventive method may be conducted in such a way that the quantity of polyalkylene glycol polymer implemented in each grinding unit is between 0.1 and 1 mg of said polymer per $m^2$ of material containing a carbonate ore, and preferably between 0.2 and 0.6 mg of said polymer per $m^2$ of material containing a carbonate ore. The surface area which the Applicant is referring to here, with respect to the material containing a carbonate ore, is its specific surface area measured using the BET method, in accordance with the technique which is well known to the person skilled in the art (ISO 9277).

Additionally, it may be beneficial to make use of a polyalkylene glycol polymer characterized in that, when it is subjected to a temperature of 45° C. for a period of 16 hours, more than 75%, and preferentially more than 90% of 50 mg of said polymer placed in 50 ml of water, are not vaporized.

In a first variant, a first category of polyalkylene glycol polymers implemented according to the invention are polyethylene glycol polymers. This first group is characterized in that it consists of polyethylene glycol polymers containing a fraction of ethylene oxide polymers greater than 95%, preferentially greater than 98% of all monomers. In such a case, the polyethylene glycol polymers have a molecular weight between 500 and 10,000 g/mole, preferentially between 600 and 1500 g/mole, and very preferentially between 600 and 1000 g/mole.

In a second variant, a second category of polyalkylene glycol polymers implemented according to the invention are polypropylene glycol polymers. This second group is characterized in that it consists of polypropylene glycol polymers containing a fraction of propylene oxide polymers greater than 95%, preferentially greater than 98% of all monomers. In such a case, the polypropylene glycol polymers have a molecular weight between 500 and 6000 g/mole, preferentially between 2000 and 3000 g/mole.

In a third variant, a third group of polyalkylene glycol polymers may be implemented, and consists of copolymers of ethylene oxide and propylene oxide. They have an ethylene oxide to propylene oxide monomer ratio between 1:5 and 5:1, this ratio preferentially being equal to 3:2. they all have a molecular weight between 1000 and 5000 g/mole, preferentially between 2000 and 3000 g/mole.

Within this third group are block copolymers which contain at least one homopolymer block of polyethylene glycol and/or polypropylene glycol, corresponding to at least 20%, preferentially at least 30%, and very preferentially at least 40% of all ethylene oxide and propylene oxide monomer units.

Additionally, these block copolymers may be three-block polymers: they comprise 3 homopolymer blocks of polyethylene glycol and/or polypropylene glycol.

These three-block polymer units may be such that the homopolymer block of polyethylene glycol (PEG) is located between two homopolymer blocks of polypropylene glycol (PPG); these three-block units are, in such cases, referred to as PPG/PEG/PPG polymers.

In another variant, these three-block polymer units may be such that the homopolymer block of the polypropylene glycol is located between two blocks of homopolymers of polyethylene glycol; these three-block units are then referred to as PEG/PPG/PEG polymers.

These various forms of polyalkylene polymers, according to the inventive method, may be mixed with one another to form a mixture of polyalkylene glycol polymers that may be used in step a) of the inventive method. If this occurs, it is preferable that such mixtures comprise at least 2 polyethylene glycol polymers, at least one polypropylene glycol polymer, and at least one block copolymer. It may also be advantageous for this mixture to specifically comprise at least two polyethylene glycol polymers, at least one polypropylene glycol polymer, and at least one block copolymer, in an ethylene oxide-to-propylene oxide ratio between 90:10 and 10:90.

The various forms of polyalkylene glycol polymers implemented in the inventive method may also be mixed with agents which are not the polyalkylene glycol in step a) of the method. If so, it is preferable that said polyalkylene glycol polymer represents at least 50% by weight, and preferentially at least 85% by weight, and very preferentially at least 95% by weight, of the total weight constituted by the polyalkylene glycol polymer and agents which are not polyalkylene glycol.

In one particular variant of the invention, the agent which is not polyalkylene glycol is a carbohydrate, tri-isopropyl amine (TIPA), or a mixture thereof. Said TIPA may advantageously be used in combination with a polyethylene glycol polymer whose molecular weight is between 600 and 1000 g/mole, and in a TIPA-to-polyethylene glycol polymer ratio of 80:20. Said carbohydrate may be a sucrose, a sorbitol, or mixtures thereof.

The inventive method may particularly be implemented for materials containing a carbonate ore containing at least 80%, and preferentially at least 90% carbonate ore with respect to the weight of said material. This carbonate ore is a natural or synthetic product, and may particularly be dolomite, calcium carbonate, or mixtures thereof.

Regarding calcium carbonate, it may be limestone, marble, chalk, a precipitated calcium carbonate or mixtures thereof, and more preferentially limestone, marble, or mixtures thereof The uncarbonated part of the material to be ground may consist of a clay, a non-clayey silicate, a silica, or mixtures thereof. Preferentially, this clay may be a bentonite, a kaolin, a calcinated clay or mixtures thereof, and this non-clayey silicate may be a talc, a mica, or mixtures thereof.

According to another aspect, the inventive method is also characterized in that the material containing a carbonate ore with a diameter d95 (95% by weight of the particles have a diameter less than this value, as measured using a Malvern™ Mastersizer™ S grain sizer, version 2.18) before step a) less than or equal to 30 m, preferentially less than or equal to 5 mm, and very preferentially less than or equal to 2 mm. More particularly, the inventive method is also characterized in that the material containing a carbonate ore has a median diameter before step a) between 0.2 and 0.7 mm, and preferentially between 0.4 and 0.5 mm, as measured using sieves.

The inventive method is also characterized in that it is a continuous method.

According to this method, the polyalkylene glycol polymer may be added to a material containing the carbonate ore before step a), and preferentially before any step a) of the inventive method.

Regarding the grinding units implemented during step a), they may consist of at least on wheel mill and/or at least one ball mill and/or at least one spring mill comprising grinding beads. Regarding these units, it may be advantageous to implement a peripheral speed between 5 and 60 m/s, preferentially between 20 and 40 m/s.

For a ball mill, the grinding beads included within it have a Brinell hardness between 510 and 600. Preferentially, they are made of iron, such as iron-based alloys with molybdenum or chromium, porcelain and/or silicates, and they have a mean bead diameter between 5 and 50 mm, preferentially between 15 and 25 mm. In one preferred aspect of the invention, these grinding beads have an aspect ratio (length-to-width ratio) between 1/3 and 3/1. In some cases, it may be advantageous to use a mixture of grinding beads of various diameters, with a bimodal distribution of median diameters.

In another preferred aspect, these grinding beads are found in a volume ratio, with respect to the material to be ground contained within the ball mill, between 1.8:1 and 3.6:1, and preferentially this ratio is equal to 2.5:1.

Step a) of dry grinding of the inventive method may also be followed by one or more steps of classification b), with at least one step of classification b) taking place.

In the event that at least 2 classification steps take place before any later step a), either one of these 2 steps may take place in succession or simultaneously.

This classification may particularly take place within a cyclone and/or rotor classifier. In such a case, it is preferable that the rising flow of this classification unit's transport gas has a speed between 3 and 15 m/s, and preferentially between 8 and 12 m/s.

In some cases, it may be advantageous to recirculate part of the material resulting from classification step b) to step a) for additional grinding. This is particularly true for classified particles with a spherical equivalent diameter outside of the range required for the inventive ground materials, known as "recyclable materials". The inventive recyclable ground materials have an equivalent spherical diameter between 0.7 and 150 μm, preferentially between 1 and 45 μm, and very preferentially between 2 and 5 μm.

In the event that the recyclable ground materials are extracted after the classification system, and the remaining materials are readded during step a), it may be beneficial to add a fresh quantity of the material containing a carbonate ore during step a), for the purpose of maintaining a constant weight of material within the grinding unit.

Another object of the invention also consists of the products, characterized in that they are obtained by the inventive grinding method.

These products are also characterized in that the polyalkylene glycol polymers are detected by methods based in gel-phase chromatography (GPC) or high-pressure liquid chromatography (HPLC), using protocols well known to the person skilled in the art.

Finally, another object of the invention consists of the products obtained by the inventive method, in the fields of sealants, plastics, paper, paint, and applications for agriculture.

Said plastic may be a rigid or plasticized PVC, a polyethylene plastic, a polypropylene plastic, or mixtures thereof.

Said sealant comprises silicons, polysulphides and mixtures thereof.

Finally, the inventive products may also service as materials for supplying a later wet grinding method; this wet grinding may or may not take place in the presence of dispersing agents.

EXAMPLES

The following examples are non-limiting, and are given here for the purpose of illustrating certain aspects of the invention; they do not in any way limit the scope of the invention.

Experimental Procedure for a Method Implementing a Ball Mill

In examples 1 to 6, the dry grinding is performed continuously, in a "Hosokawa™ Mill S.O. 80/32" sold by the company HOSOKAWA™, equipped with an Alpine Turboplex™ 100 ATP classifier sold by the company ALPINE™. The output of the grinding chamber is equipped with an opening 20×6 mm in size. The classifier is set to 300 m³/hour, while its rotational speed and air speed are set in such a way as to obtain a ground material with a diameter less than or equal to a given value (the material ground in this manner is called a recyclable ground material); the remaining ground materials whose diameter is greater than this value are readded to the mill's feed.

All grinding is performed using 100 kg of barrel-shaped Cylpeb™ 25 mm iron grinding beads, with a mean diameter of 25 mm. The grinding is conducted in such a way so that 15 kg of the material to be ground is at all times present in the system. In this manner, the feed is continuously fed with the quantity of fresh material corresponding to the quantity of recyclable ground material which exits the system, and in such a way as to keep 15 kg of material in the system.

After the system was started, and before the results shown below were recorded, the system was operated until stable values were obtained for the quantity of recyclable ground material, the grinding capacity, and the grinding energy.

Grinding Aid Agents

The grinding aid agents denoted PEG consist of polymers which are 100% composed of ethylene oxide monomer units ending in —OH groups.

The grinding aid agents denoted PPG consist of polymers which are 100% composed of propylene oxide monomer units ending in —OH groups.

The grinding aid agents denoted PO/EO/PO consist of three-block copolymers with an ethylene oxide block unit located between two propylene oxide blocks, and are sold under the name Pluronic RPE 1740 sold by the company BASF. These copolymers have a molecular weight of 2,830 g/mole, with the ethylene oxide monomers accounting for 1,130 g/mole and the propylene oxide monomers accounting for 700 g/mole of the polymer.

The grinding aid agents denoted MPG consist of 1,2-propanediol, and were obtained from the company FLUKA™.

The grinding aid agents denoted EG consist of ethylene glycol, and were obtained from the company FLUKA™.

The grinding aid agents denoted DEG consist of diethylene glycol, and were obtained from the company FLUKA™.

Measurement Methods

Except for the feed material, which was measured using sieves, all median particle diameters were determined with a Mastersizer™ S device, version 2.18 sold by the company MALVERN™. The value dx corresponds to the particle diameter for which a fraction x of particles has a diameter less than that value.

Example 1

This example illustrates the partial instability of marble when it undergoes a force such as during the grinding method. The following chemical equation is proposed to represent this decomposition:

$CaCO_3 \rightarrow CaO + CO_2$ 50 g of Italian marble corresponding to example 5 was ground for 10 minutes in a coffee bean grinder available commercially, equipped with a rotating blade 30 mm in diameter.

A paste is then produced by adding to the blank ground product 50 ml of colorless solution: 1 mole of $AgSO_4$ et 1 mole of $MnSO_4$.

It is observed that the paste turns gray on its surface, attesting to the fact that the reaction between the silver and manganese cations with the $OH^-$ ions of calcium hydroxide from lime, resulting from the reaction of $CaCO_3$ decomposition.

Example 2

This example illustrates the yellowing that results from the reaction between the decomposition products of the ground carbonate and a selection of dry grinding aid agents.

In each of the tests, 5 g of CaO were dispersed in colorless glycols as indicated in table 1, and stored at 23° C. in a kiln for 5 days.

TABLE 1

| Dry grinding aid agent | Color of liquid phase 1 hour after adding CaO | Color of liquid phase 5 hours after adding CaO |
|---|---|---|
| According to the prior art | | |
| EG | yellow | Brown-to-black |
| DEG | yellow | Yellow-to-red |
| According to the invention | | |
| PO/E0/P0 | colorless | colorless |
| PEG (molecular weight = g/mol) | colorless | colorless |
| PPG (molecular weight = 400 g/mol) | colorless | colorless |

Example 3

This example illustrates the improved grinding ability in an inventive method, compared to a method which does not implement a dry grinding aid agent, and when grinding an Australian marble.

Before grinding, the marble, with a median diameter of 1 to 10 cm, had previously been ground in a hammer mill.

The size distribution of particles in the mill's feed, as analyzed by running them through various sieves, is given in table 2.

TABLE 2

| Fraction of particles whose diameter is: | % |
|---|---|
| >1 mm | 17.20 |
| 500 μm-1 mm | 16.50 |
| 200-500 μm | 18.80 |
| 100-200 μm | 12.80 |
| 50-100 μm | 16.30 |
| <50 μm | 18.40 |

This marble was added to the grinding section of the system in order to obtain a ground material with a median diameter equal to 2.5 μm and with an air flow of 300 m³/hour.

The grinding aid agents were added to the grinding system in such a way as to maintain a constant quantity of grinding aid agents with respect to the material to be ground.

TABLE 3

| Test | Type of grinding aid agent | Grinding aid agent (molecular weight g/mol) | Quantity of grinding aid agent (ppm) | Classifier's rotational speed (rpm) | Product ground d50 (μm) | Grinding capacity (kg/h) |
|---|---|---|---|---|---|---|
| According to the invention | | | | | | |
| A | PEG | 600 | 2,000 | 7,000 | 2.6 | 10.6 |
| B | PEG | 800 | 2,000 | 7,500 | 2.5 | 8.8 |
| C | PEG | 800 | 4,000 | 7,500 | 2.6 | 9.8 |

TABLE 3-continued

| Test | Type of grinding aid agent | Grinding aid agent (molecular weight g/mol) | Quantity of grinding aid agent (ppm) | Classifier's rotational speed (rpm) | Product ground d50 (μm) | Grinding capacity (kg/h) |
|---|---|---|---|---|---|---|
| D | PEG | 1,000 | 2,000 | 8,000 | 2.5 | 7.4 |
| E | PPG | 400 | 2,000 | 7,000 | 2.5 | 9.0 |
| F | PPG | 4,000 | 2,000 | 7,000 | 2.5 | 11.0 |
| According to the prior art | | | | | | |
| G | none | | none | 8,000 | 2.5 | 0.5 |

The results of table 3 clearly show that grinding ability is improved by the invention.

Example 4

Test D of example 3 was repeated 4 times, using 2000 ppm of grinding aid agents and a rotational speed of the classifier equal to 7500 revolutions per minutes, in order to demonstrate the reproducibility of such results.

TABLE 4

| Test | Product ground d50 (gm) | Grinding capacity (kg/h) |
|---|---|---|
| D1 | 2.50 | 8.5 |
| D2 | 2.41 | 9.1 |
| D3 | 2.75 | 8.1 |
| D4 | 2.36 | 9.9 |

Example 5

This example illustrates the improved grinding ability of an Italian marble, for the inventive method, compared with a grinding method implementing grinding aid agents found in the prior art.

Before grinding, the marble, with a median diameter of 1 to 10 cm, had previously been ground in a hammer mill.

The size distribution of particles in the mill's feed, as analyzed by running them through various sieves, is given in table 2.

TABLE 5

| Fraction of particles whose diameter is: | % |
|---|---|
| >1 mm | 29.90 |
| 500 μm-1 mm | 8.50 |
| 200-500 μm | 17.50 |
| 100-200 μm | 17.70 |
| 50-100 μm | 10.80 |
| <50 μm | 15.60 |

This marble was added to the grinding section of the system in order to obtain a ground material with a median diameter equal to 2.5 μm and with an air flow of 300 m³/hour.

The grinding aid agents were added to the grinding system in such a way as to maintain a constant quantity of grinding aid agents with respect to the material to be ground.

TABLE 6

| Test | Type of grinding aid agent | Grinding aid agent (molecular weight g/mol) | Quantity of grinding aid agent (ppm) | Product ground d50 (gm) | Grinding capacity (kg/h) |
|---|---|---|---|---|---|
| According to the invention | | | | | |
| I | Mélange | 1,000 | 7,000 | 2.6 | 10.0 |
| J | PO/EO/PO | 500 | 4,000 | 5.0 | 14.0 |
| K | PO/EO/PO | 1,000 | 7,000 | 2.6 | 11.0 |
| According to the prior art: | | | | | |
| L | aucun | — | 7,000 | 2.5 | 1.3 |
| M | MPG | 1,500 | 7,000 | 2.5 | 9.5 |

The mixture corresponding to test 1 is a mixture of PEG with a molecular weight of 600 g/mole and PPG with a molecular weight of 4000 g/mole, in PEG:PPG mass ratio equal to 1:1.

The results in table 6 clearly show that the inventive method improves the grinding ability when compared to a control without a grinding aid agent, and makes it possible to equal and/or improve upon this ability when compared to a method implementing a grinding aid agent found in the prior art.

Example 6

The volatility of various grinding aid agents in various solvents was compared, after being stored for 16 hours in a ventilated kiln at 45° C.

In each of the tests, 50 mg of the grinding aid agent indicated were added into an open bag and mixed with 50 mL of solvent before being added to the kiln.

The degree of volatility was determined by measuring the residual weight in each bag after a period of 16 hours, in order to calculate the percentage of loss by weight.

TABLE 7

| Dry grinding agent | Volatility in water | Volatility in methanol | Volatility in ethanol |
|---|---|---|---|
| According to the invention | | | |
| PEG (600 g/mol) | | <10% | <10% |
| PEG (800 g/mol) | | <10% | |
| PEG (1,000 g/mol) | <10% | <10% | |
| PPG (400 g/mol) | | <10% | |
| PO/EO/PO | <10% | <10% | <10% |

TABLE 7-continued

| Dry grinding agent | Volatility in water | Volatility in methanol | Volatility in ethanol |
|---|---|---|---|
| According to the prior art | | | |
| MPG | >90% | >90% | |
| EG | >90% | >90% | |
| DEG | <90% | >90% | >90% |

The results in table 7 show that the grinding aid agents found in the prior art are more volatile, due to their low steam pressure.

Experimental Procedure for a Method Implementing a Pin Mill

In examples 7 and 8, the dry grinding is performed continuously, in a Kollopolex 160 Z laboratory pin mill (built in 1970, with a rotor diameter of 16 cm, at a rotational speed of 14,000 revolutions per minute, and containing 400 pins) made by the company HOSOKAWA ALPINE™ (Augsburg, Del.).

Grinding Aid Agents

The grinding aid agents denoted PEG 6000 consist of polymers more than 99% composed of ethylene oxide monomer units ending in OH groups, with a molecular weight equal to 6000 g/mol.

The grinding aid agents denoted MPG consist of 1,2-propanediol, and were obtained from the company FLUKA™.

The grinding aid agents denoted EO/PO/EP consist of three-block copolymers with one block of propylene oxide located between two blocks of ethylene oxide, and are sold under the name Lumiten PT by the company BASF.

The grinding aid agents denoted "fructose" (a carbohydrate) were obtained from the company FLUKA™.

Measurement Methods

The size of the ground particles is determined using sieves for all diameters greater than 100 μm, and with Mastersizer™ S version 2.18 device sold by the company MALVERN™ (using the Fraunhofer, calculation method, 3$$D) for all diameters less than 100 μm.

The value $d_x$ corresponds to the particle diameter for which a fraction x of particles has a diameter less than that value.

Example 7

This example compares the ability to grind a marble from South Tyrol, Meran, Italy, for the inventive grinding method, compared with a grinding method implementing grinding aid agents according to the prior art.

Before grinding, the marble, with a median diameter of 1 to 10 cm, had previously been ground in a hammer mill.

The size distribution of particles in the pin mill's feed, as analyzed by running them through various sieves, is given in table 8.

TABLE 8

| Fraction of particles whose diameter is: | % |
|---|---|
| 2800-5000 μm | 20 +/− 1 |
| 1000-2800 μm | 80 +/− 1 |
| <1000 μm | <1 +/− 1 |

2.5 kg of this marble was then mixed in a mixer for 2 hours with the dry grinding aid agent, the nature and quantity of which are indicated in the table below. For tests R and S, the dry grinding aid agent is formed of an aqueous solution, with a dry extract of 20% by mass of fructose, and PEG 6000, in a mass ratio of 1:1.

Afterwards, this mixture was continuously added over a period of 15 minutes into the grinding section of the pin mill, and ground to obtain a ground material with a median diameter of 15 μm.

TABLE 9

| | Test | | | | | |
|---|---|---|---|---|---|---|
| | N (Prior Art) | O (Prior Art) | P (Invention) | Q (Invention) | R (Invention) | S (Invention) |
| Dry grinding aid agent | MPG | MPG | PEG 6000 | PEG 6000 | Suspension of PEG 6000/fructose in a 1:1 mass ratio | Suspension of PEG 6000/fructose in a 1:1 mass ratio |
| Quantity of grinding aid agent (ppm)*** | 250 | 500 | 250 | 500 | 500 | 1,000 |
| Properties of the ground product | | | | | | |
| Fraction of particles whose diameter is less than 100 ppm | 99.0 | 98.0 | 99.1 | 99.2 | 98.8 | 98.8 |
| $d_{90}$ (μm) | 44.5 | 39.4 | 39.2 | 37.9 | 36.9 | 36.2 |
| d50 (μm) | 17.7 | 15.2 | 15.0 | 14.9 | 14.7 | 13.3 |
| d10 (μm) | 2.6 | 2.2 | 2.2 | 2.3 | 2.2 | 1.8 |

***calculated by dry weight compared with the dry weight of the material to be ground.

The results of table 9 clearly show that using the inventive method, the use of 250 ppm of the grinding aid agent of the inventive method (calculated by dry weight over the dry weight of the material to be ground) makes it possible to obtain a ground calcium carbonate with characteristics which essentially equivalent compared to a method implementing twice as large a quantity of grinding aid agents found in the prior art (test O and test P).

Example 8

This example compares the ability to grind limestone from the region of southern Ulm, Germany, for the inventive method, compared to a grinding method implementing grinding aid agents in accordance with the prior art.

Before grinding, the limestone, with a median diameter of 1 to 10 cm, had previously been ground in a hammer mill.

The size distribution of particles in the mill's feed, as analyzed by running them through various sieves, is given in table 10.

TABLE 10

| Fraction of particles whose diameter is: | |
|---|---|
| 2800-5000 μm | 20 +/− 1 |
| 1000-2800 μm | 80 +/− 1 |
| <1000 μm | <1 +/− 1 |

2.5 kg of this limestone was then mixed in a mixer for 2 hours with the dry grinding aid agent, the nature and quantity of which are indicated in the table below. For tests T and U, the dry grinding aid agent is formed of an aqueous solution with a dry extract of 50% by mass.

Afterwards, this mixture was continuously added over a period of 5 minutes into the grinding section of the pin mill, and ground to obtain a ground material with a median diameter of 5 μm.

TABLE 11

| | Test | |
|---|---|---|
| Dry grinding aid agent | T (Prior Art) MPG | U (Invention) EO/PO/EO |
| Quantity of grinding aid agent (ppm)*** | 250 | 250 |
| Properties of the ground product | | |
| Fraction of particles whose diameter is less than 100 ppm | 66.8% | 57.4% |
| $d_{90}$ (μm) | 23.33 | 22.42 |
| d50 (μm) | 5.34 | 5.30 |
| d10 (μm) | 1.03 | 1.04 |

***calculated by dry weight compared with the dry weight of the material to be ground.

The results in table 11 show that the inventive method leads to a product whose d50 is comparable to that obtained by a method in accordance with the prior art.

An experimental procedure for a method implementing a porcelain ball mill.

In example 9, the dry grinding is performed non-continuously, in a "Hosokawa™ 1-25LK" laboratory ball mill sold by the company HOSOKAWA ALPINE™ (Augsburg, Del.), with a diameter of 19.5 cm and a height of 24 cm.

The grinding is performed using 1,968 g of porcelain grinding beads, with 21 of these beads having a diameter of 28 mm, 107 a diameter of 120 mm, 73 a diameter of 15 mm, and 16 a diameter of 12 mm.

Grinding Aid Agents

The grinding aid agents denoted PEG 6000 consist of polymers more than 99% composed of ethylene oxide monomer units ending in OH groups, with a molecular weight equal to 6000 g/mol.

The grinding aid agents denoted MPG consist of 1,2-propanediol, and were obtained from the company FLUKA™.

Measurement Methods

The size of the ground particles is determined by running them through various sieves.

Example 9

This example illustrates the improvement in the ability to ground marble from northern Norway, for the inventive grinding method, compared with a grinding method implementing grinding aid agents found in the prior art The XRD analysis (D8 Advance by Brucker AXS) performed on the marble indicates that it contains 4.16% by mass of HCl-insolubles (primarily quartz, mica, and various silicas).

Before grinding, the marble, with a median diameter of 1 to 10 cm, had previously been ground in a hammer mill.

The size distribution of particles in the mill's feed, as analyzed by running them through various sieves, is given in table 12.

TABLE 12

| Fraction of particles whose diameter is: | % |
|---|---|
| >1000 μm | 33.2 |
| <1000 μm | 66.8 |
| <500 μm | 41.4 |
| <200 μm | 18.6 |
| <100 μm | 10.0 |
| <50 μm | 4.6 |

800 g of this marble was ground in the porcelain bead mill, in the presence of the grinding aid agents indicated in the table below, over a period of 24 hours at a speed of 90 revolutions per minute.

The dry grinding aid agents, which were added to the system, were in the form of an aqueous suspension with a dry extract of 50% by mass.

Following the grinding, the ground marble was separated from the porcelain beads with a sieve whose gaps were 1 cm apart. The ground material was then classified using sieves.

TABLE 13

| | Test | |
|---|---|---|
| Dry grinding aid agent | T (Prior Art) MPG | U (Invention) PEG 6000 |
| Quantity of grinding aid agent (ppm)*** | 1,500 | 1,500 |
| Properties of ground product | | |
| Fraction (%) of particles whose diameter is less than: | | |
| >1000 μm | 2.3 | 0.1 |
| <1000 μm | 97.7 | 99.9 |
| <500 μm | 91.5 | 99.6 |
| <200 μm | 63.6 | 77.5 |
| <100 μm | 27.9 | 50.2 |
| <50 μm | 3.5 | 7.3 |

***calculated by dry weight compared with the dry weight of the material to be ground.

The results in table 13 show that the inventive method leads to a finer product, and therefore constitutes a more effective grinding method than the prior art.

The invention claimed is:

1. A method for dry milling a material containing a carbonate ore, wherein the method comprises the following steps:
   a) dry milling the material in at least one milling unit:
      (i) in the presence of at least one polyalkylene glycol polymer having monomer units forming a backbone, where at least 90% of the monomer units forming the backbone of the polymer are constituted by ethylene oxide, propylene oxide or their mixtures, and where the polymer has a molecular weight of at least equal to 400 g/mole, (ii) such that the milling unit contains a quantity of water that is less than 10% in dry weight of the material in the milling unit;

b) optionally classifying the material from step a) with at least one classification unit;

c) optionally repeating steps a) and/or b) with all or part of the material from step a) and/or step b).

2. The method according to claim 1, wherein at least 95% of the monomer units forming the backbone of the polymer are constituted by ethylene oxide, propylene oxide or their mixtures.

3. The method according to claim 1, wherein at least 98% of the monomer units forming the backbone of the polymer are constituted by ethylene oxide, propylene oxide or their mixtures.

4. The method according to claim 1, wherein each milling unit contains 0.01 to 0.5% in dry weight of the polymer in proportion to the dry weight of the material containing carbonate ore.

5. The method according to claim 1, wherein each milling unit contains between 0.1 and 1 mg of the polymer per $m^2$ of the material containing a carbonate ore.

6. The method according to claim 1, wherein when the polyalkylene glycol polymer is subjected to a temperature of 45° C. for a period of 16 hours, more than 75% of 50 mg of the polyalkylene glycol polymer placed in 50 ml of water are not volatilised.

7. The method according to claim 1, wherein the polyalkylene glycol polymer is a glycol polyethylene in which over 95% of its monomers are ethylene oxide monomers, and wherein the polymer has a molecular weight of between 500 and 10,000 g/mol.

8. The method according to claim 1, wherein the polyalkylene glycol polymer is a glycol polyethylene in which over 98% of its monomers are ethylene oxide monomers, and wherein the polymer has a molecular weight of between 500 and 10,000 g/mol.

9. The method according to claim 1, wherein the polyalkylene glycol polymer is a glycol polypropylene in which over 95% of its monomers are propylene oxide monomers, and wherein the polymer has a molecular weight of between 500 and 6,000 g/mol.

10. The method according to claim 1, wherein the polyalkylene glycol polymer is a glycol polypropylene in which over 98% of its monomers are propylene oxide monomers, and wherein the polymer has a molecular weight of between 500 and 6,000 g/mol.

11. The method according to claim 1, wherein the polyalkylene glycol polymer is an ethylene oxide and polypropylene oxide copolymer.

12. The method according to claim 11, wherein the copolymer has an ethylene oxide:

propylene oxide ratio of between 1:5 and 5:1.

13. The method according to claim 11, wherein the copolymer has an ethylene oxide:

propylene oxide ratio of 3:2.

14. The method according to claim 11, wherein the copolymer has a molecular weight of between 1,000 and 5,000 g/mol.

15. The method according to claim 11, wherein the copolymer is a block copolymer which includes at least one block of glycol polyethylene and/or glycol polypropylene homopolymer, representing at least 20% of the total of the ethylene oxide and propylene oxide monomer units.

16. The method according to claim 11, wherein the copolymer is a block copolymer which includes at least one block of glycol polyethylene and/or glycol polypropylene homopolymer, representing at least 30% of the total of the ethylene oxide and propylene oxide monomer units.

17. The method according to claim 11, wherein the copolymer is a block copolymer which includes at least one block of glycol polyethylene and/or glycol polypropylene homopolymer, representing at least 40% of the total of the ethylene oxide and propylene oxide monomer units.

18. The method according to claim 1, wherein a mixture of glycol polyalkylene polymers is used.

19. The method according to claim 18, wherein the said mixture contains at least 2 glycol polyethylene polymers, at least one glycol polypropylene polymer and at least one block copolymer polymer, with an ethylene oxide: propylene oxide ratio of between 90:10 and 10:90.

20. The method according to claim 1, wherein the polyalkylene glycol polymer is mixed with agents which are not glycol polyalkylenes, and wherein the polyalkylene glycol polymer represents at least 50% by weight of the total weight of the polyalkylene glycol polymer and the non glycol polyalkylene agents.

21. The method according to claim 1, wherein the polyalkylene glycol polymer is mixed with agents which are not glycol polyalkylenes, and wherein the polyalkylene glycol polymer represents at least 86% by weight of the total weight of the polyalkylene glycol polymer and the non glycol polyalkylene agents.

22. The method according to claim 1, wherein the polyalkylene glycol polymer is mixed with agents which are not glycol polyalkylenes, and wherein the polyalkylene glycol polymer represents at least 95% by weight of the total weight of the polyalkylene glycol polymer and the non glycol polyalkylene agents.

23. The method according to claim 22, wherein the non glycol polyalkylene agent is a carbohydrate, tri-isopropyl amine, or mixtures thereof.

24. The method according to claim 23, wherein the carbohydrate is a sucrose, a sorbitol, or mixtures thereof.

25. The method according to claim 1, wherein the material containing a carbonate ore contain at least 80% of carbonate ore in proportion to the weight of the material.

26. The method according to claim 1, wherein the material containing a carbonate ore contain at least 90% of carbonate ore in proportion to the weight of the material.

27. The method according claim 1, wherein the carbonate ore is dolomite, calcium carbonate or mixtures thereof.

28. The method according to claim 27, wherein carbonate ore is calcium carbonate selected from limestone, marble, chalk, precipitated calcium carbonate or mixtures thereof.

29. The method according to claim 27, wherein carbonate ore is calcium carbonate selected from limestone, marble or mixtures thereof.

30. The method according to claim 1, wherein the material containing a carbonate ore has a median diameter before stage a) of between 0.2 and 0.7 mm, as measured using sieves.

31. The method according to claim 1, wherein stage b) takes place.

32. The method according to claim 1, wherein at least 2 classification stages take place before a further stage a), and in that one or other of these 2 stages may occur in series or in parallel.

33. The method according to claim 31, wherein part of the material from the classification stage b) is recirculated back to stage a) for further milling.

34. The method according to claim 31, wherein the material from stage b) has an equivalent spherical diameter of between 0.7 and 150 μm.

35. The method according to claim 1, characterised in that a new amount of material containing carbonate ore is added to stage a).

* * * * *